US007856663B2

(12) United States Patent
Rodriguez et al.

(10) Patent No.: US 7,856,663 B2
(45) Date of Patent: *Dec. 21, 2010

(54) SECURITY SCREENING OF ELECTRONIC DEVICES BY DEVICE IDENTIFIER

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/853,993

(22) Filed: Sep. 12, 2007

(65) Prior Publication Data

US 2008/0005804 A1    Jan. 3, 2008

Related U.S. Application Data

(63) Continuation of application No. 10/718,091, filed on Nov. 20, 2003, now Pat. No. 7,290,287.

(51) Int. Cl.
*G06F 7/04* (2006.01)
(52) U.S. Cl. ......................................... 726/27; 713/182
(58) Field of Classification Search ................. 713/182; 378/57, 58, 62, 86; 726/27; 252/478; 424/9.4
See application file for complete search history.

(56) References Cited

U.S. PATENT DOCUMENTS

| 5,299,116 | A | 3/1994 | Owens et al. |
|---|---|---|---|
| 5,367,552 | A | 11/1994 | Peschmann |
| 5,841,350 | A | 11/1998 | Appalucci et al. |
| 6,097,301 | A | 8/2000 | Tuttle |
| 6,218,943 | B1 | 4/2001 | Ellenbogen |
| 6,286,102 | B1 * | 9/2001 | Cromer et al. ............. 726/35 |
| 6,601,190 | B1 | 7/2003 | Meyer et al. |
| 6,650,240 | B2 | 11/2003 | Lee et al. |
| 6,707,879 | B2 * | 3/2004 | McClelland et al. .......... 378/57 |

(Continued)

OTHER PUBLICATIONS

Murray, Charles J., "Network Spec Released For Everyday Products", Electronic Engineering Times, Sep. 15, 2003, p1, 4 pages.

(Continued)

*Primary Examiner*—Kimyen Vu
*Assistant Examiner*—April Y Shan
(74) *Attorney, Agent, or Firm*—Justin M. Dillon; Amy J. Pattillo

(57) ABSTRACT

A method, system, and program for security screening of electronic devices by device identifier are provided. A security scanning system detects an identifier from an electronic device. The identifier may be a radio frequency identifier or other type of identifier which is preferably detectable by the security scanning system regardless of the operating status of the electronic device. The security scanning system queries a database with the identifier for information about the electronic device. Responsive to receiving the information about the electronic device from the central database, at least one real-time scanned characteristic of the electronic device is compared with this information. The information includes characteristics of the components of the electronic device and an x-ray overlay of the electronic device. If the real-time scanned characteristics and the information match, then electronic device is designated as secure.

25 Claims, 9 Drawing Sheets

U.S. PATENT DOCUMENTS

| | | | |
|---|---|---|---|
| 6,721,391 | B2 | 4/2004 | McClelland et al. |
| 6,826,715 | B1 * | 11/2004 | Meyer et al. .................. 714/37 |
| 6,952,163 | B2 | 10/2005 | Huey et al. |
| 7,139,406 | B2 | 11/2006 | McClelland et al. |
| 7,574,608 | B2 * | 8/2009 | Rodriguez et al. .......... 713/182 |
| 2003/0085163 | A1 | 5/2003 | Chan et al. |
| 2003/0225612 | A1 | 12/2003 | DeSimone et al. |
| 2005/0198513 | A1 | 9/2005 | Rodriguez et al. |

OTHER PUBLICATIONS

Cohn, Michael, "Keeping Data Safe: Protecting Data On Handheld Devices Helps Keep Confidential Information From Prying Eyes.", Internet World, vol. 8, No. 4, Apr. 2002, p46(3), 6 pages.

Rao, Ed, "Application of an Explosive Detection Device Based on Quadrupole Resonanace (QR) Technology in Aviation Security", IEEE, 2001, p. 282-288, 7 pages.

Luke, Alison, "Protection Without Wires", Building Services Journal, Nov. 1999, p. 28-29, 2 pages.

Electronic Engineering Times, "Embedded Processing—Atmel E2PROM Allows Users to Embed Security Features", May 4, 1998, p. PG56, 1 page.

Wagner, Mitch, "IBM Sounds Alarm With Upcoming PCs", InternetWeek, No. 711, Apr. 20, 1998, p16(1), 2 pages.

* cited by examiner

SECURITY SCREENING OF ELECTRONIC DEVICES BY DEVICE IDENTIFIER

CROSS-REFERENCE TO RELATED APPLICATIONS:

This application is a continuation of commonly assigned U.S. patent application Ser. No. 10/718091, filed Nov. 20, 2003, which is hereby incorporated herein by reference.

BACKGROUND OF THE INVENTION

1. Technical Field

The present invention relates in general to improved security systems and in particular to a method for improving security screening of electronic devices. Still more particularly, the present invention relates to comparing real-time characteristics of electronic devices with previously specified characteristics for each electronic device identified by a unique identifier, wherein the electronic device is considered secure if the real-time characteristics match the previously specified characteristics.

2. Description of the Related Art

Providing adequate security is an increasing problem. Airports tend to require advanced security precautions. In particular, more focus is placed on screening all items that travelers will take on board. These advanced security precautions are confounded by the increasing number of electronic devices that travelers desire to take on board. Examples of electronic devices that are gaining in prevalence on flights include, but are not limited to wireless phones, notebook computers, personal digital assistants (PDA)s, voice recorders, MPEG-1 layer 3 (MP3) players, cameras, electric razors, and portable cassette tape, compact disc (CD), or digital video disk (DVD) players.

Current security precautions for checking electronic devices include a standard x-ray scan and a visual examination by a security agent. A standard x-ray scan of an electronic device does not reveal sufficient information to provide the type of security needed in airports. For example, internal components of an electronic device, such as a battery, may be replaced with explosives designed to look like a battery. Further, a visual examination by a security agent to ensure that the electronic device turns on and functions does not reveal sufficient information to provide the type of security needed in airports. For example, an electronic device may include contraband or dangerous materials, but still function.

Another constraint on security precautions is the time involved in checking carry on luggage, and in particular checking electronic devices. Currently, for each electronic device, a scan and an agent check are required.

Thus, it would be advantageous to provide an enhanced screening process that pre-screens electronic devices in a reliable way to narrow down the number of electronic devices that require a hand check. It would be advantageous to quickly acquire previously stored information about each electronic device and determine whether the current device meets the specifications contained in the previously stored information. For example, it would be advantageous to provide enhanced x-ray screening enabled to compare the x-rayed internal components of each electronic device with previously stored information about the internal components of each electronic device to determine whether the components have been adjusted from the manufacturer's specification. Further, currently, there is not a system for ensuring that travelers produce all electronic devices. Thus, it would be advantageous to provide an x-ray screening that detects electronic devices within baggage that have not been separately presented for x-ray screening.

SUMMARY OF THE INVENTION

The invention provides a security system. The invention provides security screening of electronic devices with previously specified characteristics for each electronic device identified by a unique identifier, wherein the electronic device is considered secure if the real-time scanned characteristics match the previously specified characteristics.

According to one aspect of the present invention, a security scanning system detects an identifier for an electronic device at a security checkpoint. The identifier is detectable by the security scanning system regardless of the operating status of the electronic device.

The x-ray scanning system queries a database with the identifier for information about the electronic device. Responsive to receiving the information about the electronic device from the database, then real-time scanned characteristics of the electronic device are compared with the information. The real-time scanned characteristics include an x-ray scan of the electronic device that is compared with this information. If the x-ray scan and the information match, then the electronic device is designated as consistent and secure. The real-time measured characteristics include a measurement of the dimensions of the electronic device that are compared with information about the dimensions of the electronic device.

The security scanning system includes a radio frequency reader that transmits a radio frequency signal within a particular area for detecting the radio frequency identifiers (RFID)s of electronic devices within the particular area. Each RFID tag includes a memory module and a passive antenna that reads the radio frequency identifier from a memory module and reflects this identification when activated by the radio frequency waves.

Components within an electronic device include separate identifiers that are detected by the x-ray scanning system. Information for each component is accessed from the central database according to the identifier for each component. Information for each component is layered with the information for the electronic device and compared with real-time characteristics.

The central database is queried for information including, but not limited to, the physical characteristics of the electronic device, the density signature of an x-ray of the electronic device, and an x-ray overlay of the electronic device. The physical characteristics of the electronic device may the size and mass of the electronic device or the components of the electronic device and the locations of components within the electronic device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
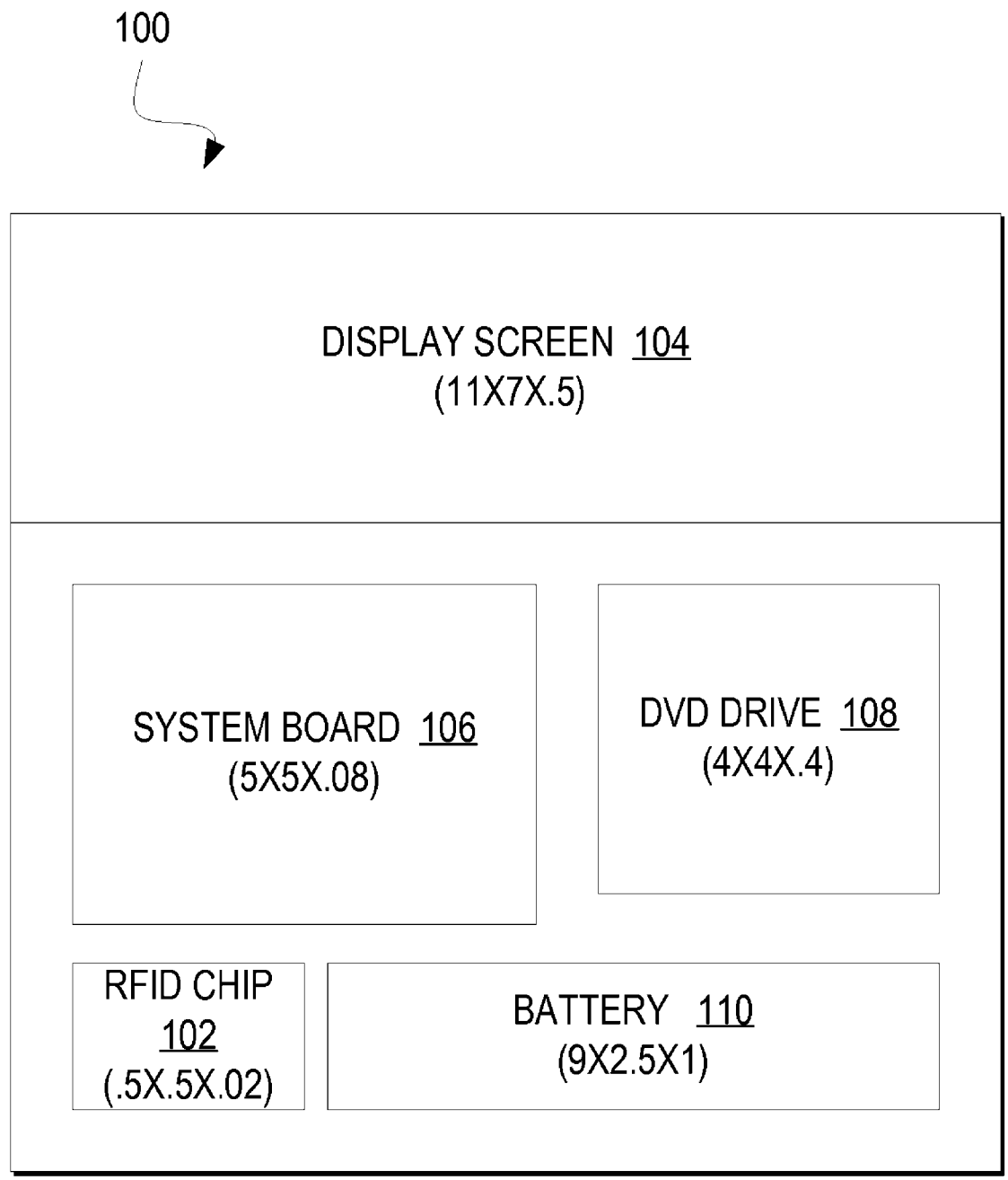
FIG. 1 is a block diagram depicting an electronic device with a radio frequency identifier (RFID) chip in accordance with the method, system, and program of the present invention

With reference now to the drawings, and in particular to FIG. 1, there is illustrated one embodiment of an electronic device with a radio frequency identifier (RFID) chip in accordance with the method, system, and program of the present invention. As illustrated, a radio frequency identification (RFID) chip 102 is affixed to an electronic device 100. Electronic device 100 preferably includes electronic circuitry and components. In the example, electronic device 100 is a notebook computer including a display screen 104, a system board 106, a DVD drive 108, and a battery 110. The dimensions of each of these components are depicted to indicate the type of information about the components of an electronic device that may be compared against the real-time characteristics of the electronic device to determine whether the electronic device is consistent with manufacturing specifications. While electronic device 100 is depicted as a notebook computer, it will be understood that electronic device 100 may include other types of electronic based devices including, but not limited to, a wireless phone, a notebook computer, a personal digital assistant (PDA), a voice recorder, an MPEG-1 Layer 3 (MP3) player, a camera, an electric razor, and a portable cassette tape, CD or digital video disk (DVD) player.

In one embodiment, RFID chip 102 is implemented in a small memory module interfacing with a passive RF antenna. The RF antenna is designed to read the RFID data from the memory module using energy generated by the RF field from an RF reader. Thus, advantageously, the RFID of electronic device 100 can be read even when electronic device 100 is not turned on.

While the present invention is described with reference to each electronic device including an RFID chip and passively transmitting an RFID, other embedded identification devices may be implemented which provide an identifier detectable by the RFID reader incorporated into the x-ray scanning system regardless of whether the electronic device is powered on or off. Alternatively, while the present invention is described with emphasis upon an RFID, the identifier for electronic device 100 may be embedded or affixed to electronic device 100 using alternate media, such as a bar code label or other types of self-emitting identification systems.

Figure 2:
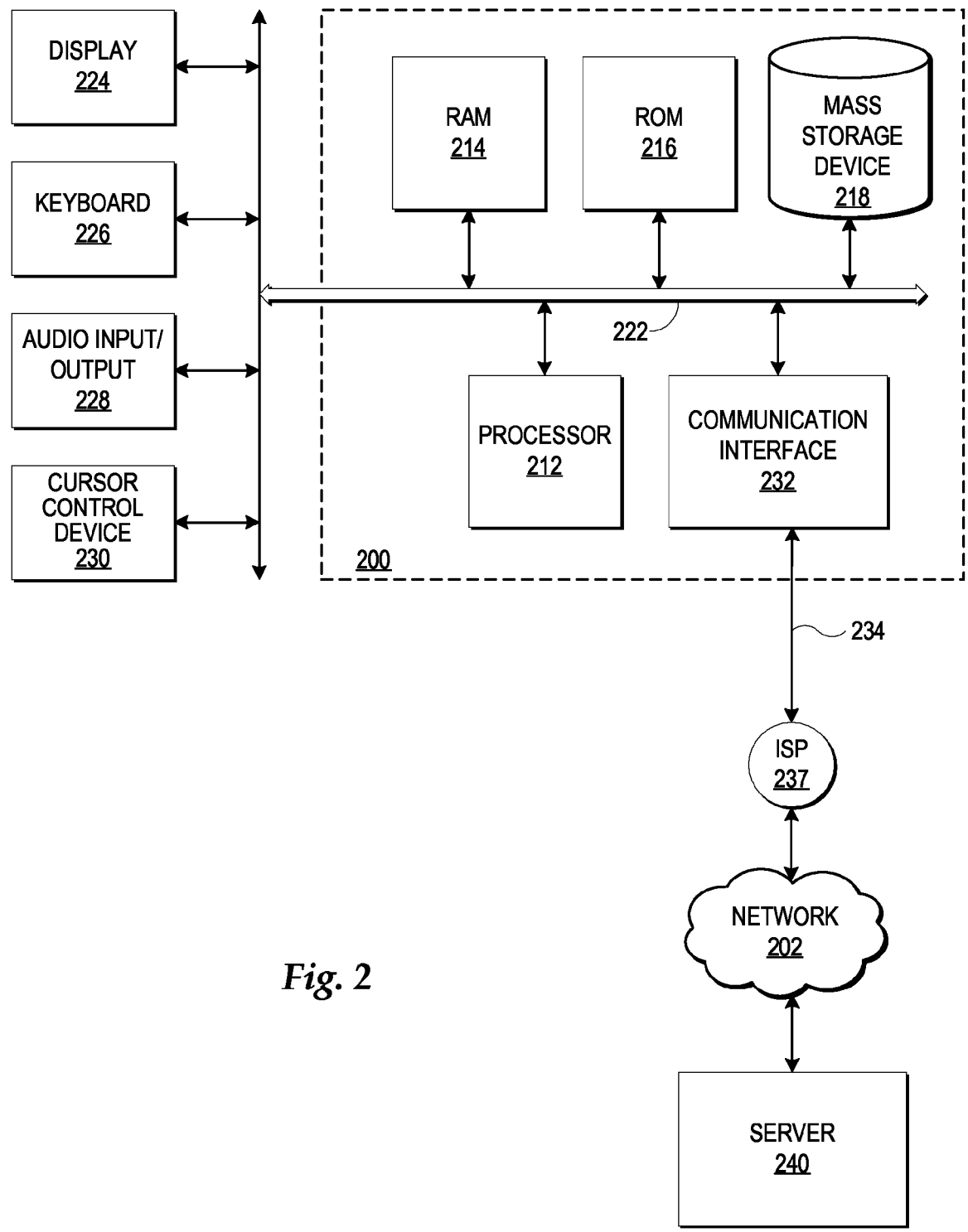
FIG. 2 is a block diagram depicting a computer system in which the present method, system, and program may be implemented.

Referring now to FIG. 2, there is depicted one embodiment of a computer system in which the present method, system, and program may be implemented. The present invention may be executed in a variety of systems, including a variety of computing systems under a number of different operating systems. In general, the present invention is executed in a computer system that performs computing tasks such as manipulating data in storage that is accessible to the computer system. In addition, the computer system includes at least one output device and at least one input device.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server system, computer system 200 typically includes multiple processors designed to improve network servicing power.

Processor 212 may be a general-purpose processor such as IBM's PowerPC™ processor that, during normal operation, processes data under the control of operating system and application software accessible from a dynamic storage device such as random access memory (RAM) 214 and a static storage device such as Read Only Memory (ROM) 216. The operating system preferably provides a graphical user interface (GUI) to the user. In a preferred embodiment, application software contains machine executable instructions that when executed on processor 212 carry out the operations depicted in the flowcharts of FIGS. 9A-9B, 10, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium (or computer operable medium) having stored thereon the machine executable instructions (or program code) used to program computer system 200 to perform a process according to the present invention. The terms "machine-readable medium" and "computer operable medium" as used herein, include any medium that participates in providing instructions to processor 212 or other components of computer system 200 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic, electromagnetic, or light waves, such as those generated during radio frequency or infrared data communications.

Moreover, the present invention may be downloaded as a computer program product, wherein the program instructions may be transferred from a remote computer such as a server 240 to requesting computer system 200 by way of data signals embodied in a carrier wave or other propagation medium via a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or as depicted herein, directly to an Internet Service Provider (ISP) 237. In particular, network link 234 may provide wired and/or wireless network communications to one or more networks.

ISP 237 in turn provides data communication services through network 202. Network 202 may refer to the worldwide collection of networks and gateways that use a particular protocol, such as Transmission Control Protocol (TCP) and Internet Protocol (IP), to communicate with one another. ISP 237 and network 202 both use electrical, electromagnetic, or optical signals that carry digital data streams. The signals through the various networks and the signals on network link 234 and through communication interface 232, which carry the digital data to and from computer system 200, are exemplary forms of carrier waves transporting the information.

When implemented as a server system, computer system 200 typically includes multiple communication interfaces accessible via multiple peripheral component interconnect (PCI) bus bridges connected to an input/output controller. In this manner, computer system 200 allows connections to multiple network computers.

Further, multiple peripheral components may be added to computer system 200, connected to multiple controllers, adapters, and expansion slots coupled to one of the multiple levels of bus 222. For example, an audio input/output 228 is connectively enabled on bus 222 for controlling audio input through a microphone or other sound or lip motion capturing device and for controlling audio output through a speaker or other audio projection device. A display 224 is also connectively enabled on bus 222 for providing visual, tactile or other graphical representation formats. A keyboard 226 and cursor control device 230, such as a mouse, trackball, or cursor direction keys, are connectively enabled on bus 222 as interfaces for user inputs to computer system 200. In alternate embodiments of the present invention, additional input and output peripheral components may be added. In particular, as will be further described, when computer system 200 is implemented as an x-ray scanning system, an RFID reader is preferably included as an additional peripheral component for detecting RFIDs from electronic devices.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
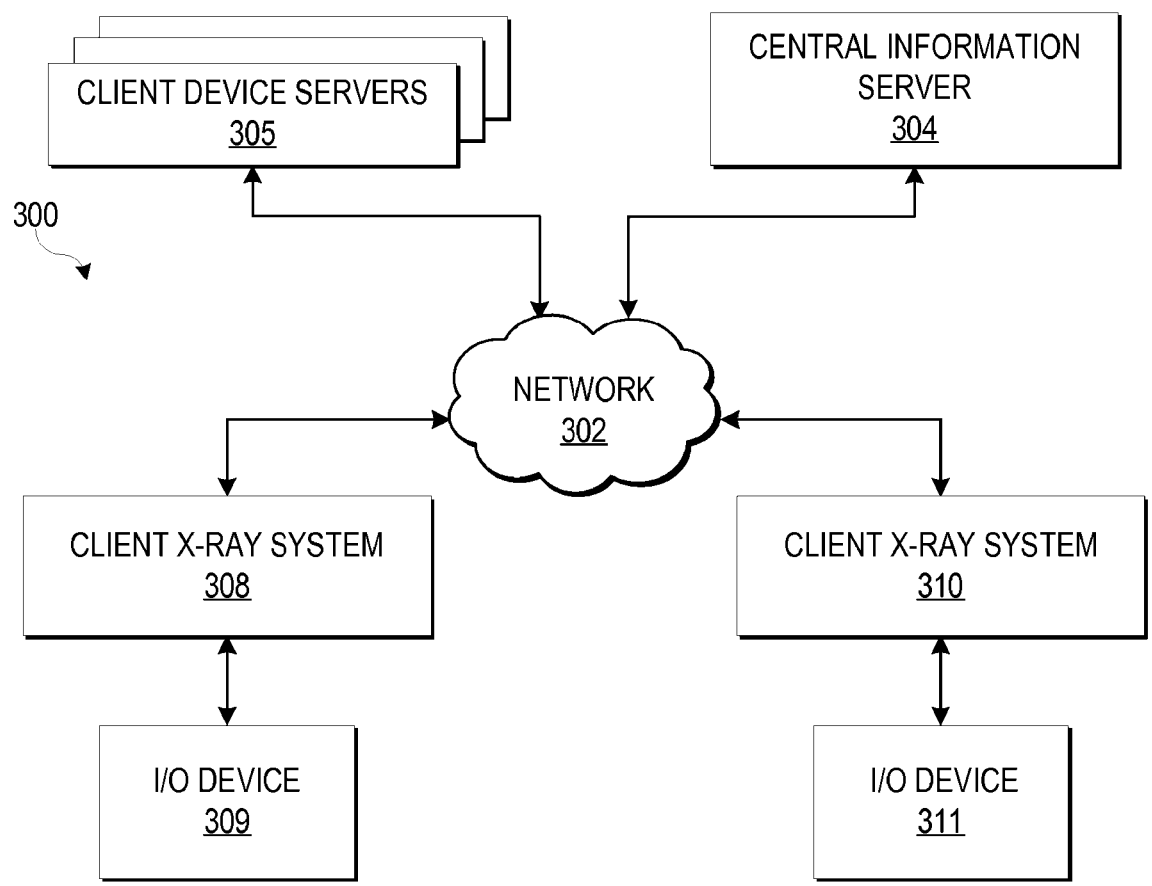
FIG. 3 is a block diagram depicting a distributed network system for facilitating an electronic device scanning system.

With reference now to FIG. 3, a block diagram depicts a distributed network system for facilitating an electronic device scanning system. Distributed network system 300 is a network of computers in which the present invention may be implemented. Distributed network system 300 contains a network 302, which is the medium used to provide communications links between various devices and computers connected together within distributed network system 300. Network 302 may include permanent connections such as wire or fiber optics cables, temporary connections made through telephone connections, and wireless transmission connections.

In the depicted example, central information server 304 and client device servers 305 are connected to network 302. In addition, client x-ray systems 308 and 310 are connected to network 302 and provide a user interface through input/output (I/O) devices 309 and 311.

The client/server environment of distributed data processing system 300 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client systems 308 and 310 and render Web documents (pages) served by a web server, such as server 304. Additionally, each of client systems 308 and 310 and server 304 may function as both a "client" and a "server" and may be implemented utilizing a computer system such as computer system 200 of FIG. 2. Further, while the present invention is described with emphasis upon central information server 304 and client device servers 305 enabling access to a database of information about electronic devices, the present invention may also be performed by client x-ray systems 308 and 310 engaged in peer-to-peer network communications via network 302.

The Web may refer to the total set of interlinked hypertext documents residing on servers all around the world. Network 302, such as the Internet, provides an infrastructure for transmitting these hypertext documents between client x-ray systems 308 and 310 and server 304. Documents (pages) on the Web may be written in multiple languages, such as Hypertext Markup Language (HTML) or Extensible Markup Language (XML), and identified by Uniform Resource Locators (URLs) that specify the particular web page server from among servers, such as server 304 and pathname by which a document can be accessed, and then transmitted from the particular web page server to an end user utilizing a protocol such as Hypertext Transfer Protocol (HTTP) or file-transfer protocol (FTP).

Distributed network system 300 preferably facilitates secure communications. In particular, for example, central information server 304, client device servers 305, and client x-ray systems 308 and 310 may communicate using secure socket layers (SSL). Further, central information server 304 and client device servers 305 may require additional authentication of the user operating client x-ray systems 308 and 310. It will be understood that central information server 304 and client device servers 305 may implement additional security features for requests to access information about electronic devices.

While network 302 is described with reference to the Internet, network 302 may also operate within an intranet or other available networks. For example, network 302 may use an intranet of wired and wireless secured communications within each airport that then accesses the Internet to communicate with central information server 304. Alternatively, a mirrored copy of the database in central information server 304 may be placed in a server accessible to client x-ray systems 308 and 310 within an airport intranet.

A central information server 304 may store information for device RFIDs. Additionally client device servers 305 preferably store information for device RFIDs by manufacturer. When an RFID is scanned by one of client system 308 or 310, the RFID is sent either to central information server 304 or one of the client device systems 305 to acquire the electronic device information for the RFID.

Alternatively, while client x-ray systems 308 and 310 are described in one embodiment as systems dependent on a network connected to access RFID information, in an alternate embodiment, client x-ray systems 308 may be standalone systems at a security checkpoint. In particular client x-ray systems 308 and 310 may receive, for example, weekly or daily updates of an RFID database stored locally from a temporary network connection or a portable storage device, such as a diskette or CD.

Figures 4, 5:
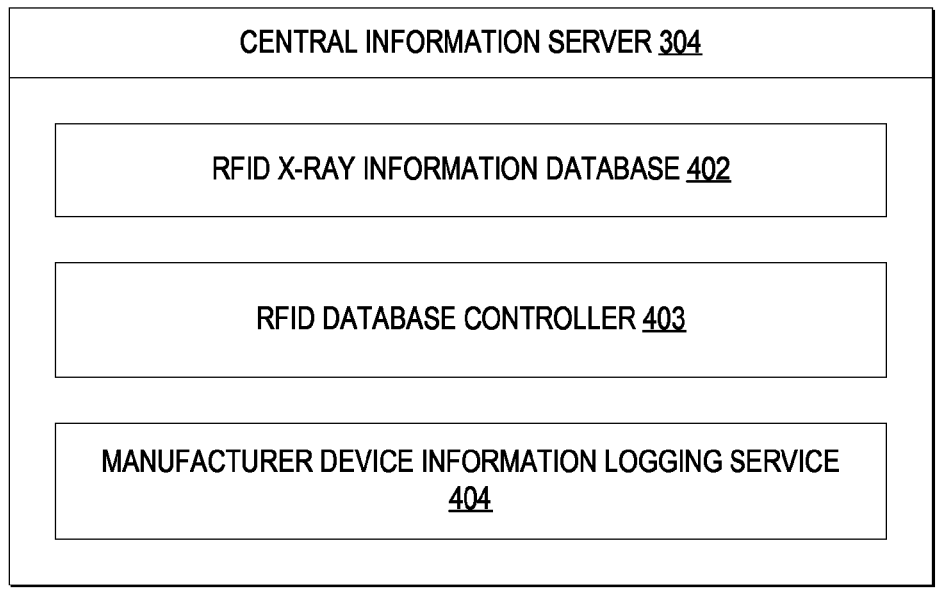
FIG. 4 is a block diagram depicting the components of a central information server in accordance with the method, system, and program of the present invention.
FIG. 5 is a block diagram depicting an RFID x-ray information database in accordance with the method, system, and program of the present invention.

Referring now to FIG. 4, there is depicted a block diagram of the components of a central information server in accordance with the method, system, and program of the present invention. As illustrated, a central information server 304 includes an RFID x-ray information database 402, an RFID database controller 403, and a manufacturer device information logging service 404. These components may also be included in the client device manufacturer servers 305 described in FIG. 3.

Database 402 preferably includes information about the components of electronic devices sorted according to the RFID of the electronic devices. A client x-ray system may request the information by providing the RFID of an electronic device to central information server 304. RFID database controller 403 preferably authenticates requests from client x-ray systems and searches database 402 with the RFID. If there is information about the electronic device for the RFID, then controller 403 formats the information for transmission to the client x-ray system requesting the information. A client x-ray system may request information first from either central information server 304 or the client device manufacturer servers 305 and then send the request to the other server if the first server cannot process the request.

Logging service 404 preferably interfaces with manufacturers to store information about electronic devices based on electronic device RFIDs. Logging service 404 may also authenticate the identities of manufacturers loading device information and manage a worldwide accessible RFID database system.

With reference now to FIG. 5, there is depicted a block diagram of an RFID x-ray information database in accordance with the method, system, and program of the present invention. As illustrated RFID x-ray information database 402 includes multiple fields. First, an RFID field 502 preferably indicates the manufacturer, the type of product, and the serial number unique to the electronic device. For example, in RFID field 502, entries 510 and 512 identify the type of product by letters where "LTOP" is for a laptop and "MP3" is for an mp3 player. The first set of numbers following the device type identifier is an alphanumerical code for the manufacturer. After additional information, the last 8 digit number is the unique serial number for the example electronic devices. In one specification of coded identifier 502, a 96-bit product tag is used to identify each electronic device. Additional information in coded identifier 502 may include the country of origin of the electronic device, the country of sale of the device, whether the electronic device is issued to a government employee, the date of manufacture, and other information which is relevant to uniquely identifying an electronic device.

Next, component locations field 504 includes file numbers for files that identify the locations, sizes, and other characteristics of components within electronic devices. For example, in component locations field 504, entries 510 and 512 identify the files for component locations associated with specific RFIDs. Since multiple electronic devices may share the same internal component location information, files are identified by manufacturer number, product number and batch number, for example. Alternatively, component locations field 504 may include actual data entries, rather than a file identifier.

Component characteristics stored in component locations field 504 may be identified, for example, by numerical measurements or by a schematic grid overlay image. Further, the physical sizes and weights of components of the electronic device may be identified with tolerance values to compensate for the x-ray measurements.

Finally, an x-ray overlay field 506 includes file numbers for files that identify the x-ray overlay images for electronic devices. A manufacturer or security service preferably creates an x-ray scan of each electronic device, possibly from multiple angles, for storage in database 402. For example, in x-ray overlay field 506, entries 510 and 512 identify the overlay file by manufacturer, product number, and image number. In entry 510, multiple overlay files are identified, for different angles of an x-ray. X-ray images filed in database 402 may also include three-dimensional x-ray scans indicating the unique density signatures of electronic devices.

Often, customers may order customized electronic devices. As described above, pre-stored information for each RFID may be accessible. However, the server supplying database 402 may alternatively reactively create customized information for a customized electronic device. In particular, there may be multiple overlay images and component characteristic information files stored and that can be layered and assembled to create the information for a customized electronic device.

It will be understood that additional types of information and information fields may be implemented in x-ray information database 402. For example, the measurements of the entire electronic device and the weight of the entire electronic device as originally configured may be included in an information field.

It is important to note that a user may alter an electronic device from its original configuration. For example, a user may add a wireless network card to a laptop computer—the original configuration of the laptop computer weighs 4.5 pounds, but the additional card weighs 0.2 pounds. Preferably, each reconfigured or added component to the electronic device includes a separate RFID and information for that RFID stored in RFID x-ray information database 402. Thus, the configured information for an electronic device may be supplemented, adjusted, and layered to accommodate for changes made by a user that can be scanned.

When a scanning system detects multiple RFIDs in a single electronic device, the scanning system may send a single query for the information for the single electronic device. In this case, where a user has adjusted the original configuration of the electronic device, the information acquired from database 402 may first be layered. Alternatively, the information may be layered once it reaches the scanning system.

Additionally, it is important to note that in addition to storing x-ray based information about the configuration of an electronic device, information that is scannable through other means may also be stored. For example, the dimensions of an electronic device may be scanned by a laser and compared with the configuration dimensions for the electronic device stored in database 402.

Figure 6:
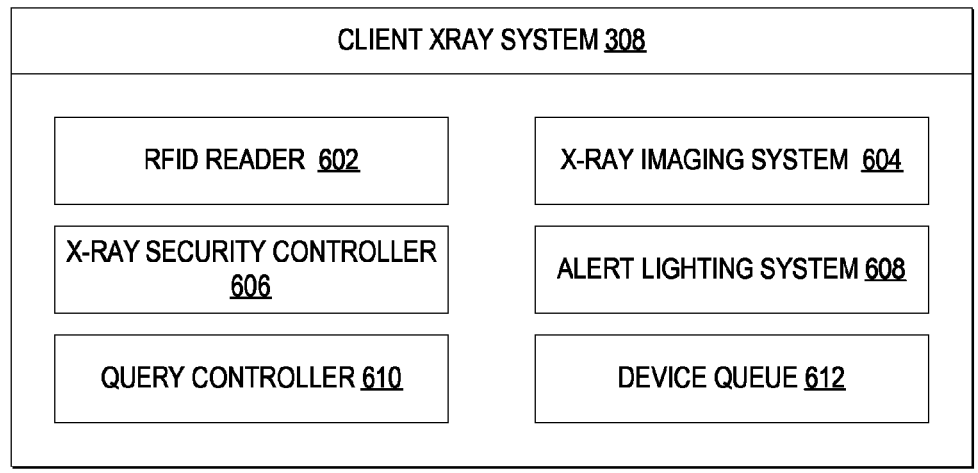
FIG. 6 is a block diagram depicting a client x-ray system in accordance with the method, system, and program of the present invention.

Referring now to FIG. 6, there is depicted a block diagram of a client x-ray system in accordance with the method, system, and program of the present invention. As illustrated, client x-ray system 308 includes multiple components.

First, client x-ray system 308 includes an RFID reader 602. RFID reader 602 preferably works across more than one RF band. Further, RFID reader 602 may generate RF signals of different strengths. In particular, a first RF signal may activate reads from electronic devices within a larger area surrounding an airport security area. Then, a second, more pointed RF signal, may activate reads from electronic devices solely within the x-ray scanning area. Moreover, RFID reader 602 may be affixed to a particular location or may be implemented in hand-held portable devices.

RFIDs read by RFID reader 602 are placed in device queue 612. Once placed in device queue 612, each RFID is preferably sent by query controller 610 to the central server system with a request for the information associated with the RFID. Query controller 610 will either receive the device's information or an indicator that no information is available for the RFID. If information is received, it is stored with the RFID in device queue 612.

Next, an x-ray imaging system 604 captures x-ray images of electronic devices. In particular, X-ray imaging system 604 is preferably equipped to take three-dimensional scans of electronic devices that produce unique density signatures that can be used to compute mass.

An x-ray security controller 606 detects which electronic device is currently scanned by x-ray imaging system 604 and compares the scanned image with the information retrieved about the electronic device. In particular, the internal component locations of the electronic device are compared with the retrieved internal component locations. For example, a tracing function within x-ray security controller 606 may create an outline of the x-ray scan of the electronic device and compare that outline with a schematic outline of the internal components retrieved for the device's RFID. Further, an overlay x-ray retrieved for the electronic device is compared with the current scan. The dimensions of the electronic device may be checked against the dimensions provided in the overlay x-ray. Additionally, the weight of the electronic device may be determined from a scale and compared with a weight designated in the characteristics. An x-ray density signature may indicate the mass of each of the components of the electronic device. Where multiple RFIDs are detected for a single device and information is retrieved for each RFID, the information may first be layered to create a single image for comparison with the scanned image or alternatively the images and other information retrieved for each RFID identified component may be separated compared.

X-ray security controller 606 indicates the electronic device is secure only if the internal components are of the designated size, in the designated locations, and of the designated weight indicated by the x-ray density signature. If x-ray security controller 606 indicates the electronic device is not secure, an attendant is alerted to hand check the electronic device and the discrepancy between the received information and the real-time scan is indicated.

An alert lighting system 608 may include multiple colored LED's, on screen alerts, or other mechanisms for alerting airport security personnel about the security status of an electronic device. The alert system preferably distinguishes between electronic devices without an RFID, electronic devices with an RFID that do not return with information from the central server, and electronic devices that do not match the information associated with their RFID.

Figure 7:
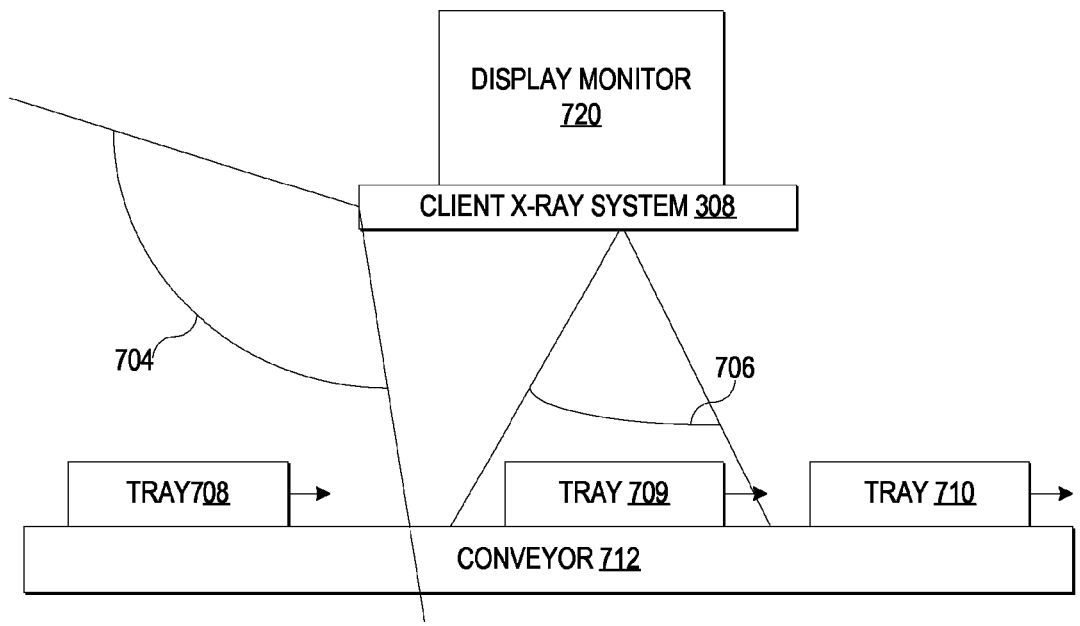
FIG. 7 is an illustrative representation depicting an RFID enhanced x-ray scanning system in accordance with the method, system, and program of the present invention.

With reference now to FIG. 7, there is depicted an illustrative representation of an RFID enhanced x-ray scanning system in accordance with the method, system, and program of the present invention. As illustrated, client x-ray system 308 sends an RF signal within an area 704. Trays, such as tray 708, located on conveyor 712 are placed within area 704. Client x-ray system 308 detects the RFID of an electronic device placed in tray 708.

Conveyor 712 moves trays along a conveyor belt. For example, trays 708, 709, and 710, each filled with an electronic device, are moved along conveyor 712 to a position for x-ray scanning. In particular, an area 706 along conveyor 712 is designated as the x-ray scanning area for client x-ray system 308. While this embodiment describes x-ray scanning of electronic devices in trays, in an alternate embodiment of the invention, electronic devices may be scanned while in a piece of luggage or just placed individually under area 706. For example, if a cell phone is located in a purse, client x-ray system 308 is still preferably enabled to detect the RFID for the cell phone and scan the cell phone to compare the real-time scanned characteristics with information acquired for the device RFID.

A display monitor 720 displays alerts generated by client x-ray system 308, the x-ray scan within area 706, and a queue of detected RFIDs. Advantageously, security personnel may view the status of each electronic device in the queue as analyzed according to the RFID information and may view an x-ray of each electronic device for additional visual checking of the contents of electronic devices.

Figure 8:
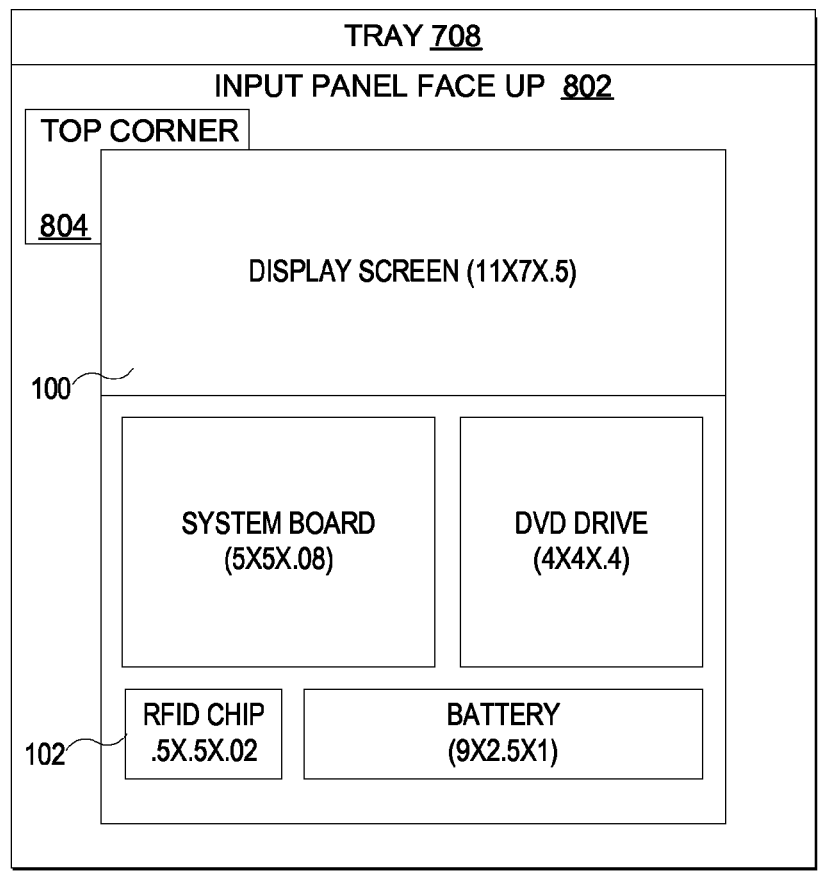
FIG. 8 is an illustrative representation depicting an electronic device prepared for scanning in accordance with the method, system, and program of the present invention.

Referring now to FIG. 8, there is depicted an illustrative representation of an electronic device prepared for scanning in accordance with the method, system, and program of the present invention. As illustrated, a tray 708 holds an electronic device 100. Multiple internal components of electronic device 100 are illustrated as an example of the type of internal component measurements than may be taken in the x-ray scan and compared with an internal component file retrieved with the device RFID. For example, the size of each of the components in inches is designated with each internal component.

To simplify the comparison process for multiple types of electronic devices from multiple manufacturers, tray 708 is preferably designed to require placement of each electronic device at a designated orientation. As illustrated, an instruction 802 indicates that the input panel should be face up. For example, the side of an electronic device that is typically considered the input interface should be face up. Additional instructions may be provided for electronic devices without a single sided input interface. Further, as illustrated, a top corner 804 is designated. Top corner 804 may be implemented as a raised angle from the surface of tray 708.

As tray 708 moves through the x-ray scan, top corner 804 provides a registration marker for computing the locations of internal components and for matching with the top left hand corner of schematics or x-ray images retrieved for the RFID of the electronic device. In the example, for an electronic device to be properly scannable, it is preferably positioned properly within tray 708. However, in alternate embodiments, for an electronic device to be properly scannable, other types of positioning requirements may be implemented. For example, x-ray overlays of the electronic device from multiple angles may be provided in the information. As another example, the real-time x-ray image may be rotated in an attempt to match the x-ray overlay of the electronic device acquired with the device RFID. While it is advantageous for travelers to place all electronic devices in a tray 708 for scanning, it is also advantageous for the RFIDs of all electronic devices physically located within a security location, whether placed in tray 708 or not, to be detected and scanned as they move through the x-ray scanning area, regardless of how the electronic devices are positioned or what is holding the electronic devices.

Figure 9:
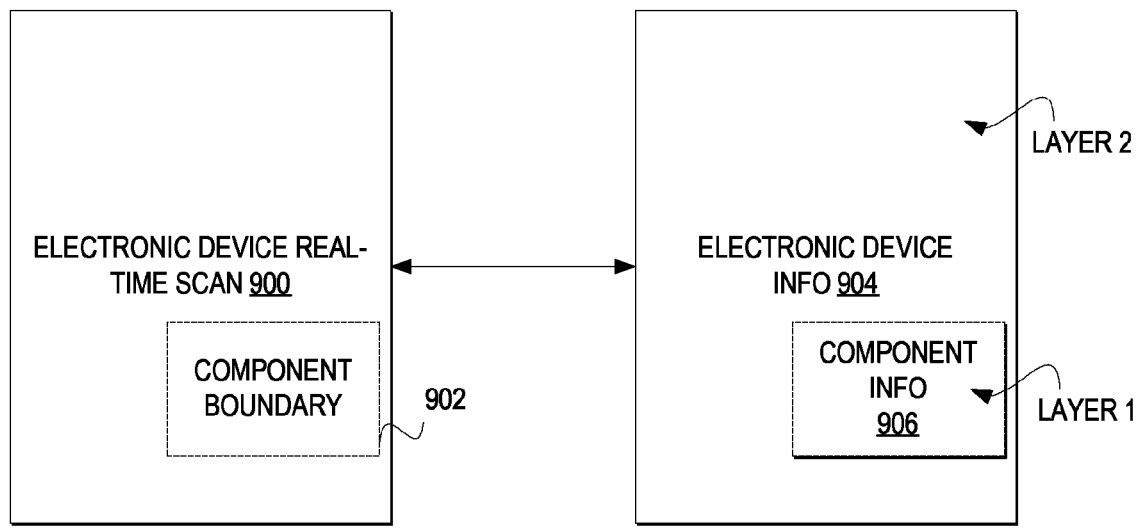
FIG. 9 is an illustrative representation depicting an example of a comparison of retrieved information about an electronic device with real-time scanned characteristics of a device in accordance with the method, system, and program of the present invention.

Referring now to FIG. 9, there is depicted an example of a comparison of retrieved information about an electronic device with real-time scanned characteristics of a device in accordance with the method, system, and program of the present invention. As illustrated an electronic device real-time scan 900 is received from an x-ray imaging system. Although not depicted in the example, real-time scan 900 preferably includes an x-ray image of an electronic device, such as electronic device 100 of FIG. 8. In alternate embodiments, real-time scan 900 may also include measurements of portions of the electronic device taken by the x-ray imaging system. Real-time scan 900 may further be converted by the x-ray security controller of a scanning security system into a schematic or other graphical image representing the characteristics of the electronic device.

Specified in the example of real-time scan 900 is a component boundary 902 which identifies the scanned boundary of a particular component within the electronic device. In particular, when the scan is performed, the x-ray imaging system will likely not distinguish between components, but merely provide image capturing capability. But, component boundary 902 is specified here in order to show the comparison of a scanned electronic device image with the information retrieved for an electronic device according to RFID. In particular, in the example, the component identified by the component boundary 902 is a component added onto the device by the consumer and the component is preferably identified by an RFID distinct from the RFID of the electronic device.

Electronic device info 904 is the graphical image or other information retrieved about the electronic device according to the RFID of the electronic device. Further, for purposes of example, component info 906 is the graphical image or other information retrieved about the add on component. In one embodiment of the present invention, component info 906 is a graphical image that is layered on the graphical image representing electronic device info 904. When both images are retrieved, electronic device info 904 may indicate where ports are located into which components may be added so that the x-ray security controller at the x-ray scanning system is directed how to position layer 2 over a port area of layer 1. Alternatively, a database server system that provides electronic device information may layer component info 906 on electronic device info 904. Further, an operator may position component info 906 on electronic device info 904.

Regardless of the manner in which information is layered, according to one embodiment, the layered image is preferably compared with real-time scan 900 by the x-ray security controller device within an x-ray scanning system. Alternatively, an operator of the system may visually compare the layered image within the real-time scan 900.

According to another embodiment, electronic device info 904 is an independent layer that the x-ray security controller compares with real-time scan 900. Electronic device info 904 will not match with real-time scan 900 in the area represented by component boundary 902. Thus, a second comparison is made by x-ray security controller of whether component info 906 matches the area represented by component boundary 902.

Figure 10A:
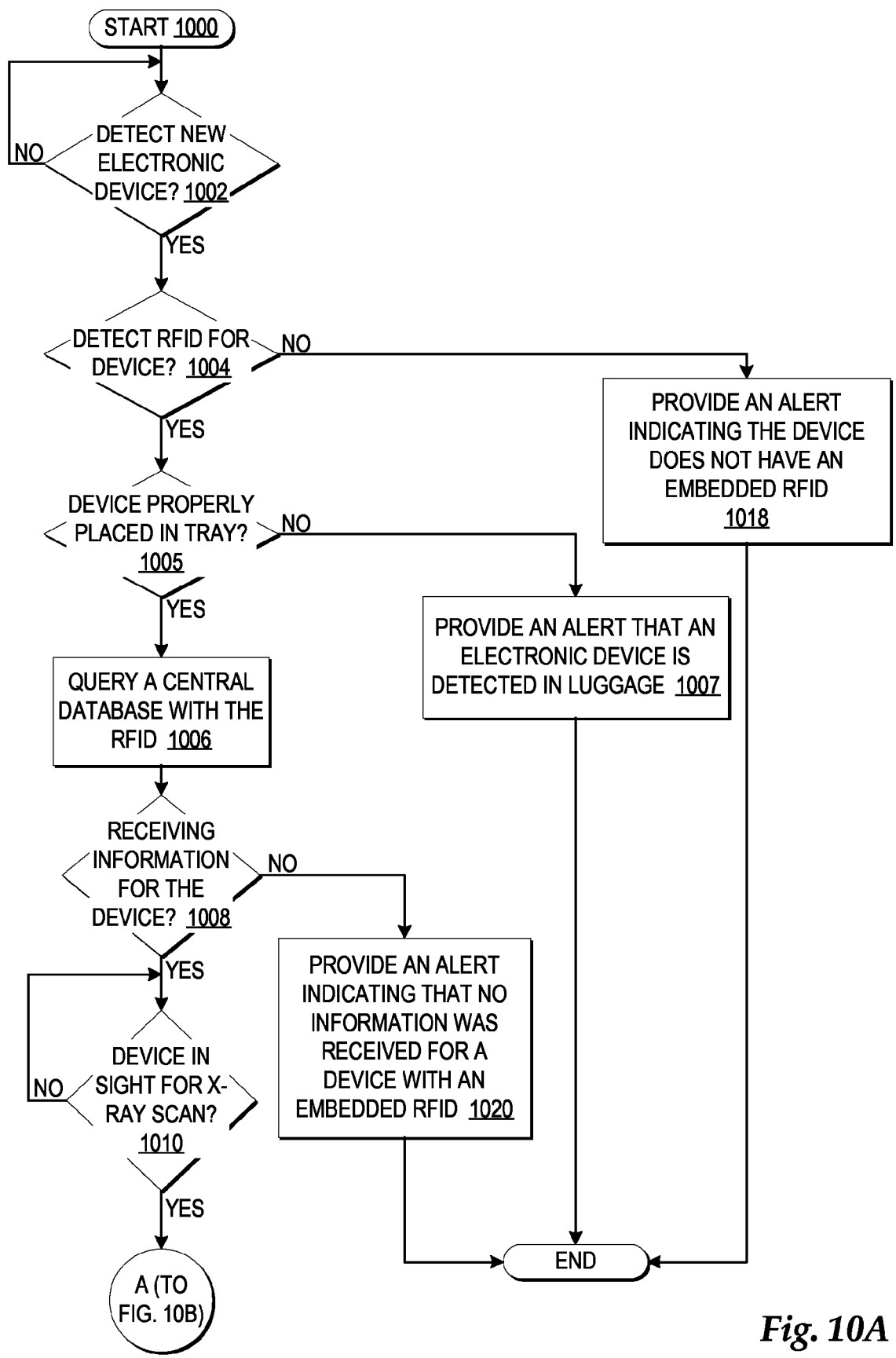
FIGS. 10A and 10B are high level logic flowcharts of a process and program for securely scanning an electronic device.
Figure 10B:
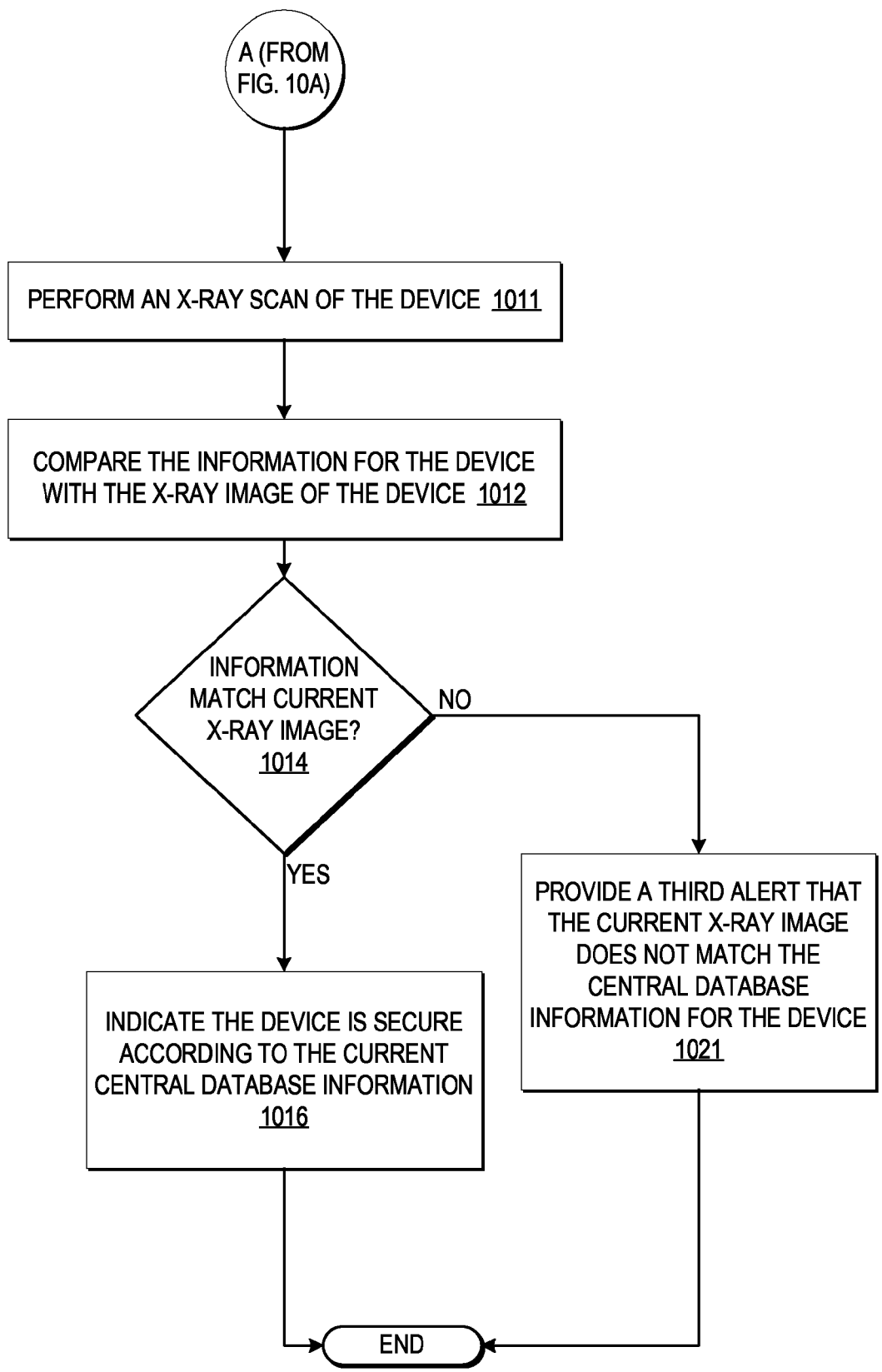

With reference now to FIGS. 10A and 10B, there is depicted a high level logic flowchart of a process and program for securely scanning an electronic device. As depicted, the process starts at block 1000 and thereafter proceeds to block 1002. Block 1002 illustrates a determination of whether a new electronic device is detected. A new device may be detected in multiple ways. For example, the weight of an electronic device may be detected on a conveyor belt leading to the x-ray scanner. Alternatively, a new device may be detected when a tray for holding electronic devices on a conveyor belt is detected. Further, a new device may be detected by detecting an RFID. In general, a new device is preferably detectable independent of whether a traveler actually places the device in a tray or on the conveyor belt itself. If a new electronic device is detected, then the process passes to block 1004. Block 1004 depicts a determination whether an embedded RFID is detected for the electronic device. If an RFID is not detected for the device, then the process passes to block 1018. Block 1018 illustrates providing an alert indicating the device does not have an embedded RFID, the process ends, and the device is manually scanned. If, however, an RFID is detected for the device, the process passes to block 1005.

Block 1005 illustrates a determination whether the RFID detected device is properly placed in a tray. If the RFID detected device is properly placed in a tray, then the process passes to block 1006. If the RFID detected device is not properly placed in a tray or other holder, then the process passes to block 1007. Block 1007 depicts providing an alert that an electronic device is detected in luggage or otherwise not properly placed in a tray or other holder, and the process ends. Alternatively, the scanning system may also be enabled to scan electronic devices that are not placed directly in trays, in which case the process would continue to block 1006. Either way, the bulk luggage scanner preferably detects RFIDs and other identifiers and indicators of electronic devices when scanning luggage.

Block 1006 depicts querying a central database with the device's RFID. Next, block 1008 illustrates a determination whether information is received for the device. If no information is received, then the process passes to block 1020. Block 1020 depicts providing an alert indicating that no information was received for the device with an RFID, the process ends, and the device is manually scanned. If, however, information is received for the device, the process passes to block 1010.

Block 1010 illustrates a determination whether the device is in sight for an x-ray scan. In particular, multiple devices may be placed on a conveyor belt and each identified when within the scanning area by their RFID. It is advantageous to detect the RFID of an electronic device in a security area before it reaches the x-ray scan area so that the information retrieved from the central database for the RFID is available by the time the device reaches the scan area. If the device is not in sight for an x-ray scan, then the process iterates at block 1010. If the device is in sight for an x-ray scan, the process passes to block 1011 through indicator "A". Block 1011 depicts performing an x-ray scan of the device. Next, block 1012 illustrates comparing the information retrieved for the device with the x-ray scan image of the device, and the process passes to block 1014. The x-ray scanning system may select what portions of the information retrieved should be compared with an x-ray scan image and automatically compare those portions of the information with the x-ray scan image using software enabled to compare an x-ray scan with a retrieved graphic file. Alternatively, an operator may select which portions of the information retrieved should be compared with an x-ray scan and initiate a process that performs the comparison. Moreover, where an electronic device includes after purchase added components that each have an independent RFID and thus independent information, the information for each component may first be combined with the information for the electronic device before the comparison is performed. This may be performed by layering the images received for each component on top of the image received for the electronic device. Alternatively, the comparison may be performed with the electronic device information and then for the information retrieved about each add on component.

Block 1014 depicts a determination whether the information retrieved for the device matches the current x-ray image. If the information retrieved for the device does not match the current x-ray image, then the process passes to block 1021. Block 1021 illustrates providing a third alert that the current x-ray image does not match the central database information for the device, and the process ends. If, however, the information retrieved for the device does match the current x-ray image, then the process passes to block 1016. Block 1016 depicts indicating that the device is secure according to the current central database information, and the process ends.

Figure 11:
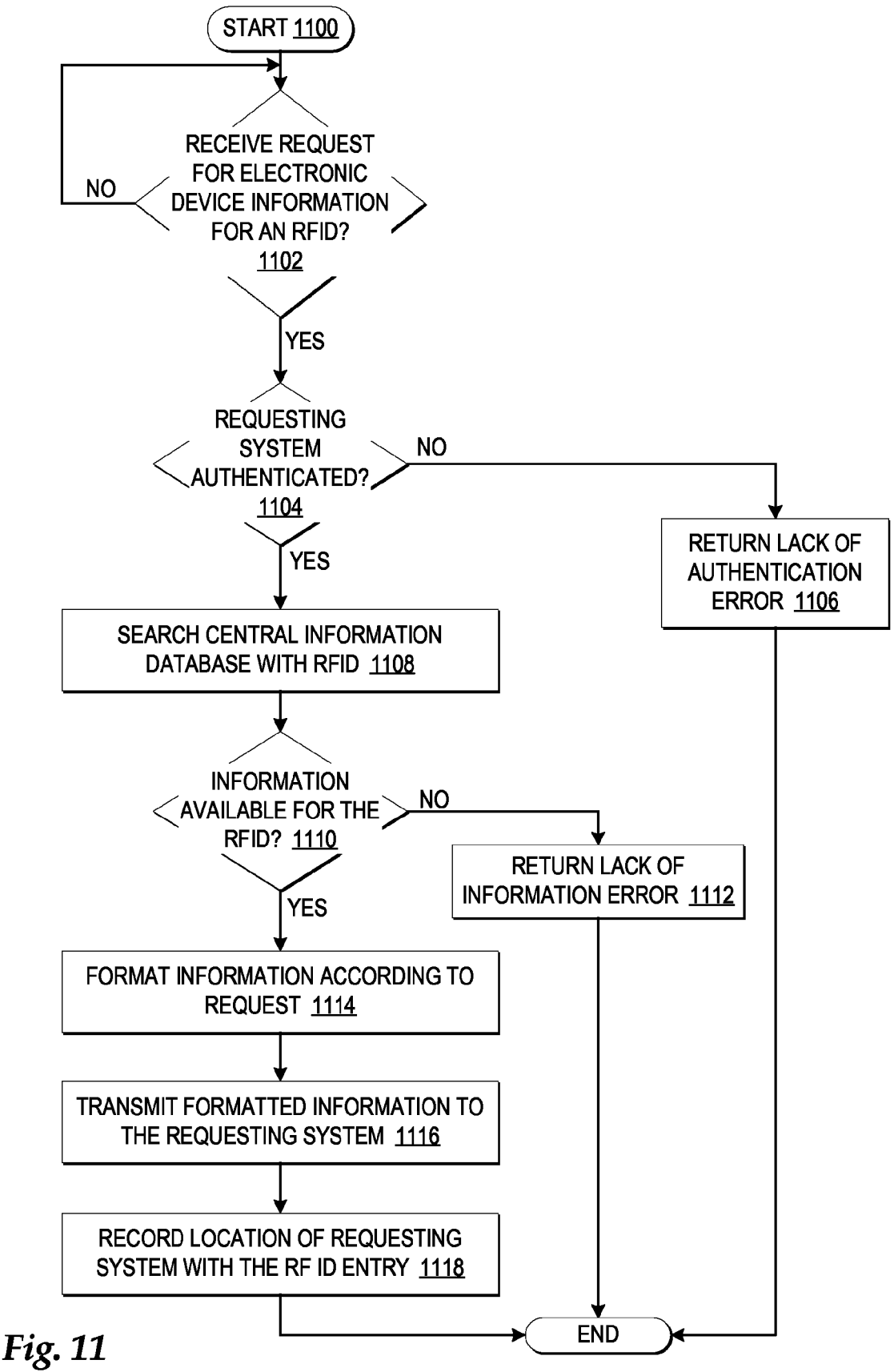
FIG. 11 is a high level logic flowchart of a process and program for controlling distribution of RFID tagged information for an electronic device.

With reference now to FIG. 11, there is depicted a high level logic flowchart of a process and program for controlling distribution of RFID tagged information for an electronic device. As illustrated, the process starts at block 1100 and thereafter proceeds to block 1102. Block 1102 depicts a determination whether a request for electronic device information for an RFID is received. If a request is not received, then the process iterates at block 1102. If a request is received, then the process passes to block 1104.

Block 1104 illustrates a determination whether the requesting system is properly authenticated. If the requesting system is not properly authenticated, then the process passes to block 1106. Block 1106 depicts returning a lack of authentication error to the requesting system, and the process ends. If the requesting system is properly authenticated, then the process passes to block 1108.

Block 1108 depicts searching the central information database with the RFID. Next, block 1110 illustrates a determination whether there is information available for the RFID in the database. If there is no information available, then the process passes to block 1112. Block 1112 depicts returning a lack of information error to the requesting system, and the process ends. Alternatively, the RFID may be sent to the manufacturer database of the manufacturer of the device. If, however, there is information available for the RFID, then the process passes to block 1114.

Block 1114 illustrates formatting the information according to the request. In particular, the request for information with the RFID may designate the type of information requested from among the multiple types of information stored for the RFID. Next, block 1116 depicts transmitting the formatted information to the requesting system. A secure link is advantageously implemented for transmitting RFID information. Thereafter, block 1118 illustrates recording the location and identification of the requesting system with the RFID entry, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for security screening of electronic devices, comprising:

detecting an identifier from an electronic device comprising a plurality of components through a radio frequency identifier reader, wherein said identifier specifies a manufacturer and a type of product for said electronic device;

detecting an additional identifier for an additional component of said electronic device which alters an original configuration of said plurality of components of said electronic device by said manufacturer;

querying a database with said identifier and said additional identifier for information about said electronic device and said additional component, wherein said database comprises information identifying for each separate identifier from among a plurality of unique identifiers of a plurality of electronic devices a separate original configuration and for each separate additional identifier from among a plurality of additional identifiers of a plurality of additional components a separate image;

responsive to receiving said information about said electronic device and said additional component from said database, comparing at least one real-time scanned characteristic of said electronic device and said additional component with said information;

responsive to said at least one real-time scanned characteristic matching said information, indicating by an xray system the electronic device is secure; and responsive to said at least one real-time scanned characteristic not matching said information, indicating by said xray system said electronic device is not secure and providing an alert by said xray system through an alert system to an attendant to hand check said electronic device.

2. The method of claim 1 for security screening wherein detecting an identifier from an electronic device further comprises:

transmitting a radio frequency signal within a particular area for detecting said electronic device; and reading said identifier from said electronic device broadcast from an antenna attached to a memory of said electronic device.

3. The method of claim 1 for security screening wherein querying a database further comprises:

querying said database with said identifier for said information comprising physical weights of said electronic device.

4. The method of claim 1 for security screening wherein comparing at least one real-time scanned characteristic of said electronic device with said information further comprises:

scanning a three-dimensional image of said electronic device to attain a density signature for a plurality of components of said electronic device; and comparing said density signature of said three-dimensional image with a previously recorded density signature returned with said information for said electronic device.

5. The method of claim 1 for security screening wherein comparing at least one real-time scanned characteristic of said electronic device with said information further comprises:

tracing a schematic figure of a plurality of components of said electronic device from a real-time x-ray scan; and comparing said schematic figure of said plurality of components with a previously recorded schematic figure returned with said information for said electronic device.

6. The method of claim 1 for security screening wherein comparing at least one real-time scanned characteristic of said electronic device with said information further comprises:

comparing a real-time x-ray scan of said electronic device with a previously recorded x-ray scan returned with said information for said electronic device.

7. The method of claim 1 for security screening further comprising:
receiving a particular image for said additional identifier for said additional component from said database layered with a particular original configuration for said electronic device for comparing at least one real-time scanned characteristic of said electronic device and said additional component with said layered information.

8. The method of claim 1 for security screening further comprising:
determining whether said electronic device is properly positioned for scanning; and
responsive to detecting that said electronic device is not properly positioned for scanning, triggering an alert signal that an electronic device is not properly scannable.

9. The method of claim 1 for security screening, wherein querying a database with said identifier for information about said electronic device further comprises:
querying said database with said identifier via a network.

10. A system for security screening of electronic devices, comprising:
a screening system;
an identification reader connected to said screening system for reading an identifier from an electronic device comprising a plurality of components within a security check area through a radio frequency identifier reader, wherein the identifier specifies a manufacturer and type of product of the electronic device and for reading an additional identifier for an additional component of said electronic device which alters an original configuration of said plurality of components of said electronic device by said manufacturer;
said screening system further comprising:
querying means for querying a database with said identifier and said additional identifier for information about said electronic device and said additional component, wherein said database comprises information identifying for each separate identifier from among a plurality of unique identifiers of a plurality of electronic devices a separate original configuration and for each separate additional identifier from among a plurality of additional identifiers of a plurality of additional components a separate one image; and
comparative means for comparing at least one real-time scanned characteristic of said electronic device and said additional component with said information, responsive to receiving said information about said electronic device and said additional component, wherein if said at least one real-time scanned characteristic and said information match, then the electronic device is considered consistent and secure.

11. The system of claim 10 for security screening wherein said identification reader further comprises:
means for transmitting a radio frequency signal within a particular area for detecting said electronic device; and
means for reading said identifier from said electronic device broadcast from an antenna attached to a memory of said electronic device.

12. The system of claim 10 for security screening wherein said querying means further comprises:
means for querying said database with said identifier for said information comprising weights characteristics of said electronic device.

13. The system of claim 10 for security screening wherein said comparative means further comprises
means for scanning a three-dimensional image of said electronic device to attain a density signature for a plurality of components of said electronic device; and
means for comparing said density signature of said three-dimensional image with a previously recorded density signature returned with said information for said electronic device.

14. The system of claim 10 for security screening wherein said comparative means further comprises:
means for tracing a schematic figure of a plurality of components of said electronic device from a real-time x-ray scan; and
means for comparing said schematic figure of said plurality of components with a previously recorded schematic figure returned with said information for said electronic device.

15. The system of claim 10 for security screening wherein said comparative means further comprises:
means for comparing a real-time x-ray scan of said electronic device with a previously recorded x-ray scan returned with said information for said electronic device.

16. The system of claim 10 for security screening, said screening system further comprising:
means for receiving a particular image for said additional identifier for said additional component from said database layered with a particular original configuration for said electronic device for comparing at least one real-time scanned characteristic of said electronic device and said additional component with said layered information.

17. The system of claim 10 for security screening, said screening system further comprising:
means for determining whether said electronic device is properly positioned for scanning; and
means, responsive to detecting that said electronic device is not properly positioned for scanning, for triggering an alert signal that an electronic device is not properly scannable.

18. The system of claim 10 for security screening wherein said screening system is communicatively connected to a network.

19. A computer program product stored only on a non-transitory computer operable medium for security screening of electronic devices, said computer program product comprising machine executable instructions that executed by the computer system:
detect an identifier from an electronic device comprising a plurality of components through a radio frequency identifier reader, wherein said identifier specifies a manufacturer and a type of product for said electronic device;
detect an additional identifier for an additional component of said electronic device which alters an original configuration of said plurality of components of said electronic device by said manufacturer;
query a database with said identifier and said additional identifier for information about said electronic device and said additional component, wherein said database comprises information identifying for each separate identifier from among a plurality of unique identifiers of a plurality of electronic devices a separate original configuration and for each separate additional identifier from among a plurality of additional identifiers of a plurality of additional components a separate image;

responsive to receiving said information about said electronic device and said additional component, compare at least one real-time scanned characteristic of said electronic device and said additional component with said information; and responsive to said at least one real-time scanned characteristic matching said information, indicate the electronic device is secure; and responsive to said at least one real-time scanned characteristic not matching said information, indicate said electronic device is not secure and providing an alert through an alert system to an attendant to hand check said electronic device.

20. The computer program product of claim 19 for security screening wherein said computer program product further comprises machine executable instructions that executed by the computer system:

transmit a radio frequency signal within a particular area for detecting said electronic device; and read said identifier from said electronic device broadcast from an antenna attached to a memory of said electronic device.

21. The computer program product of claim 19 for security screening wherein said computer program product further comprises machine executable instructions that executed by the computer system:

query said database with said identifier for said information comprising weight characteristics of said electronic device.

22. The computer program product of claim 19 for security screening wherein said computer program product further comprises machine executable instructions that executed by the computer system:

scan a three-dimensional image of said electronic device to attain a density signature for a plurality of components of said electronic device; and compare said density signature of said three-dimensional image with a previously recorded density signature returned with said information for said electronic device.

23. The computer program product of claim 19 for security screening wherein said computer program product further comprises machine executable instructions that executed by the computer system:

trace a schematic figure of a plurality of components of said electronic device from a real-time x-ray scan; and compare said schematic figure of said plurality of components with a previously recorded schematic figure returned with said information for said electronic device.

24. The computer program product of claim 19 for security screening wherein said computer program product further comprises machine executable instructions that executed by the computer system:

compare a real-time x-ray scan of said electronic device with a previously recorded x-ray scan returned with said information for said electronic device.

25. The computer program product of claim 19 for security screening wherein said computer program product further comprises machine executable instructions that executed by the computer system:

determine whether said electronic device is properly positioned for scanning; and responsive to detecting that said electronic device is not properly positioned for scanning, trigger an alert signal that an electronic device is not properly scannable.

* * * * *